United States Patent
Svec

(10) Patent No.: US 11,628,597 B2
(45) Date of Patent: Apr. 18, 2023

(54) CONTINUOUS MIXING FOR HIGHLY VISCOUS MATERIALS

(71) Applicant: BMIC LLC, Dallas, TX (US)

(72) Inventor: James A. Svec, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/544,498

(22) Filed: Dec. 7, 2021

(65) Prior Publication Data
US 2022/0176590 A1   Jun. 9, 2022

Related U.S. Application Data

(60) Provisional application No. 63/122,067, filed on Dec. 7, 2020.

(51) Int. Cl.
| | | |
|---|---|---|
| B29B 7/00 | (2006.01) | |
| B29B 7/82 | (2006.01) | |
| B29D 7/00 | (2006.01) | |
| B29B 7/58 | (2006.01) | |
| B29B 7/90 | (2006.01) | |
| B29B 7/52 | (2006.01) | |

(52) U.S. Cl.
CPC ............ B29B 7/007 (2013.01); B29B 7/52 (2013.01); B29B 7/588 (2013.01); B29B 7/823 (2013.01); B29B 7/90 (2013.01); B29D 7/00 (2013.01)

(58) Field of Classification Search
CPC ................................ B29B 7/007; B29B 7/52
See application file for complete search history.

(56) References Cited

U.S. PATENT DOCUMENTS

| | | | | |
|---|---|---|---|---|
| 4,448,736 A | * | 5/1984 | Emery | B29B 7/726 425/149 |
| 5,258,160 A | * | 11/1993 | Utsumi | B29C 48/21 264/40.3 |
| 6,200,380 B1 | * | 3/2001 | Finkelstein | C04B 28/00 106/803 |
| 10,688,688 B2 | | 6/2020 | Voith et al. | |
| 2016/0002929 A1 | * | 1/2016 | Wang | E04D 5/06 264/294 |
| 2016/0023432 A1 | * | 1/2016 | Deporter | D04H 1/413 442/393 |
| 2018/0290337 A1 | * | 10/2018 | Steiner | B29B 7/885 |
| 2021/0114932 A1 | * | 4/2021 | Liu | E01C 7/182 |

OTHER PUBLICATIONS http://www.compoundingworld.com/farrel (Year: 2012).*

* cited by examiner

*Primary Examiner* — Nicholas R Krasnow
(74) *Attorney, Agent, or Firm* — Womble Bond Dickinson (US) LLP

(57) ABSTRACT

A method includes feeding a heated polymer additive at a first temperature into a continuous mixer at a first feed rate. The method includes feeding a heated abrasive solid material at a second temperature into the continuous mixer at a second feed rate. The heated abrasive solid material and the heated polymer additive are mixed in the continuous mixer to form a first mixture.

18 Claims, 6 Drawing Sheets

CONTINUOUS MIXING FOR HIGHLY VISCOUS MATERIALS

RELATED APPLICATIONS

This application claims the benefit of U.S. Provisional Application No. 63/122,067, entitled "CONTINUOUS MIXING FOR HIGHLY VISCOUS MATERIALS," and filed on Dec. 7, 2020, the entirety of which is hereby incorporated by reference.

FIELD

At least some embodiments disclosed herein relate generally to roofing tiles. More particularly, at least some embodiments disclosed herein relate to methods for mixing materials to be formed into roofing tiles.

BACKGROUND

A tile roof typically includes sinusoidal (e.g., semi-circular or S-shaped tiles) laid in rows extending across the slope of a roof from the bottom edge of the roof toward the ridge of the roof. The rows are laid in alternating inverted and overlapped position to each other to form an undulating sequence of crests and valleys running from the bottom edge of the roof toward the ridge of the roof. Tiles for a tile roof are often made of slate, terra cotta, concrete, clay, and metals.

SUMMARY

In some embodiments, a method includes feeding a heated polymer additive at a first temperature into a continuous mixer at a first feed rate. The method includes feeding a heated abrasive solid material at a second temperature into the continuous mixer at a second feed rate. The heated abrasive solid material and the heated polymer additive are mixed in the continuous mixer to form a first mixture.

In some embodiments, a method includes feeding a polymer additive into a continuous mixer at a first feed rate. The method includes heating the polymer additive to a first temperature to form a heated polymer additive, wherein the first temperature is greater than a melting temperature of the polymer additive. The method includes heating an abrasive solid material to a second temperature to form a heated abrasive solid material. The method further includes feeding the heated abrasive solid material at the second temperature into a continuous mixer at a second feed rate. The method includes mixing the heated abrasive solid material and the heated polymer additive in the continuous mixture to form a first mixture.

In some embodiments, the first mixture can be formed into a roofing tile.

In some embodiments, a continuous mixer can be configured to receive a heated polymer additive at a first temperature and a first feed rate, and a heated abrasive solid material at a second temperature and a second feed rate. The continuous mixer can be configured to mix the heated abrasive material and the heated polymer additive to form a first mixture.

In some embodiments, a continuous mixer can be configured to receive a polymer additive at a first feed rate and heat the polymer additive to a first temperature. The continuous mixer can be configured to receive a heated abrasive solid material at a second temperature after the polymer additive has reached the first temperature. The continuous mixer can be configured to mix the heated abrasive material and the heated polymer additive to form a first mixture.

In some embodiments, the first mixture output by the continuous mixer can be formed into a roofing tile.

In some embodiments, a method includes feeding a heated polymer additive at a first temperature into a continuous mixer at a first feed rate. In some embodiments, the method includes feeding a heated abrasive solid material at a second temperature into the continuous mixer at a second feed rate. In some embodiments, the method includes mixing the heated abrasive solid material and the heated polymer additive in the continuous mixer to form a first mixture.

In some embodiments, the method includes heating an abrasive solid material to the second temperature to form the heated abrasive solid material.

In some embodiments, the method includes heating a polymer additive to the first temperature to form the heated polymer additive.

In some embodiments, the method includes forming the first mixture into a roofing tile. In some embodiments, forming the first mixture into the roofing tile includes rolling the first mixture with a plurality of rollers to a selected thickness and cutting the first mixture as rolled.

In some embodiments, the plurality of rollers includes at least one heated roller.

In some embodiments, the method includes rolling a side surface of the first mixture as rolled to form one or more surface modifications.

In some embodiments, the heated polymer additive comprises a plurality of heated polymer additives. In some embodiments, the method further includes separately heating the plurality of heated polymer additives.

In some embodiments, the heated abrasive solid material comprises a plurality of abrasive solid materials. In some embodiments, the method further includes separately heating the plurality of abrasive solid materials.

In some embodiments, the heated polymer additive is fed into the continuous mixer prior to feeding the heated abrasive solid material into the continuous mixer.

In some embodiments, the heated abrasive solid material includes sand, stone dust, or combinations thereof.

In some embodiments, a heated additive including flame retardants, colorants, or combinations thereof.

In some embodiments, the first feed rate is greater than the second feed rate.

In some embodiments, the continuous mixer does not produce pressure while mixing the heated abrasive solid material and the heated polymer additive.

In some embodiments, a programmable logic controller configured to maintain the first feed rate and the second feed rate at a selected ratio.

In some embodiments, a method includes feeding a polymer additive into a continuous mixer at a first feed rate. In some embodiments, the method includes heating the polymer additive to a first temperature to form a heated polymer additive. In some embodiments, the first temperature is greater than a melting temperature of the polymer additive. In some embodiments, the method includes heating an abrasive solid material to a second temperature to form a heated abrasive solid material. In some embodiments, the method includes feeding the heated abrasive solid material at the second temperature into the continuous mixer at a second feed rate. In some embodiments, the method includes mixing the heated abrasive solid material and the heated polymer additive in the continuous mixer to form a first mixture. In some embodiments, the method includes rolling the first mixture with a plurality of heated rollers to a selected thickness. In some embodiments, the method includes cutting the first mixture as rolled.

In some embodiments, the heated polymer additive includes a plurality of polymer additives, and wherein the method further comprises separately heating the plurality of polymer additives. In some embodiments, the heated abrasive solid material includes a plurality of abrasive solid materials and wherein the method further comprises separately heating the plurality of abrasive solid materials.

In some embodiments, the heated polymer additive is fed into the continuous mixer prior to feeding the heated abrasive solid material into the continuous mixer.

In some embodiments, one or more of: the heated abrasive solid material includes sand, stone dust, or combinations thereof; and the heated polymer additive includes flame retardants, colorants, or combinations thereof.

In some embodiments, the first feed rate is greater than the second feed rate.

In some embodiments, the continuous mixer does not produce pressure while mixing the heated abrasive solid material and the heated polymer additive.

In some embodiments, a programmable logic controller is configured to maintain the first feed rate and the second feed rate at a selected ratio.

BRIEF DESCRIPTION OF THE DRAWINGS

Reference is made to the drawings that form a part of this disclosure, and which illustrate the embodiments in which the devices and methods described herein can be practiced.

Like reference numbers represent like parts throughout.

DETAILED DESCRIPTION

At least some embodiments disclosed herein relate generally to roofing tiles. More particularly, at least some embodiments disclosed herein relate to methods for mixing materials to be formed into roofing tiles.

Current methods of manufacturing highly viscous and abrasive materials have issues of wear and low production speeds. Current processes that mix these materials tend to produce limited amounts of material that are collected by hand and pressed into tiles. The limited output is due to the existing inefficiencies of combining materials in a piece of equipment, then heating the materials as they are mixed. This results in wear on the internal parts of the mixer due to the abrasiveness of the colder materials as they are heating up inside the mixing chamber. Often, the mixer is a polymer extruder. Polymer extruders create internal pressure when pushing the materials through the machine, which adds to the wear on the internal parts.

Some embodiments described in this disclosure preheat the components of the mixture separately and introduce the materials at an appropriate temperature into a continuous mixer. The preheated components can function to lubricate the internal parts of the mixer, which can, for example, reduce an amount of contact on the mixing parts by the abrasive materials. The mixer is a continuous mixer (not a polymer extruder), which does not produce pressure while mixing the components and can efficiently mix the abrasive materials with the liquid polymers.

In some embodiments, the components of the mixture can be preheated and then provided to a continuous mixer at appropriate stages of the mixing process. This can, for example, maximize production speed and minimize wear on internal parts of the mixer.

In some embodiments, a polymer additive component can be added to a continuous mixer (e.g., in a first stage of the continuous mixer), then preheated within the continuous mixer. In such embodiments, a preheated abrasive solid material can be added to the continuous mixer after the polymer additive component is preheated (e.g., in a second stage of the continuous mixer or a middle of the continuous mixer).

This disclosure generally utilizes the examples of roofing tiles. A "roofing tile" can include a mixture of an abrasive solid material and a polymer additive component that can be formed into a tile to be hung from a roof of a structure such as a building. It is to be appreciated that other building materials, formed of mixtures that include multiple components including an abrasive solid material and a polymer additive component, are also within the scope of the principles described in this disclosure.

Figure 1:
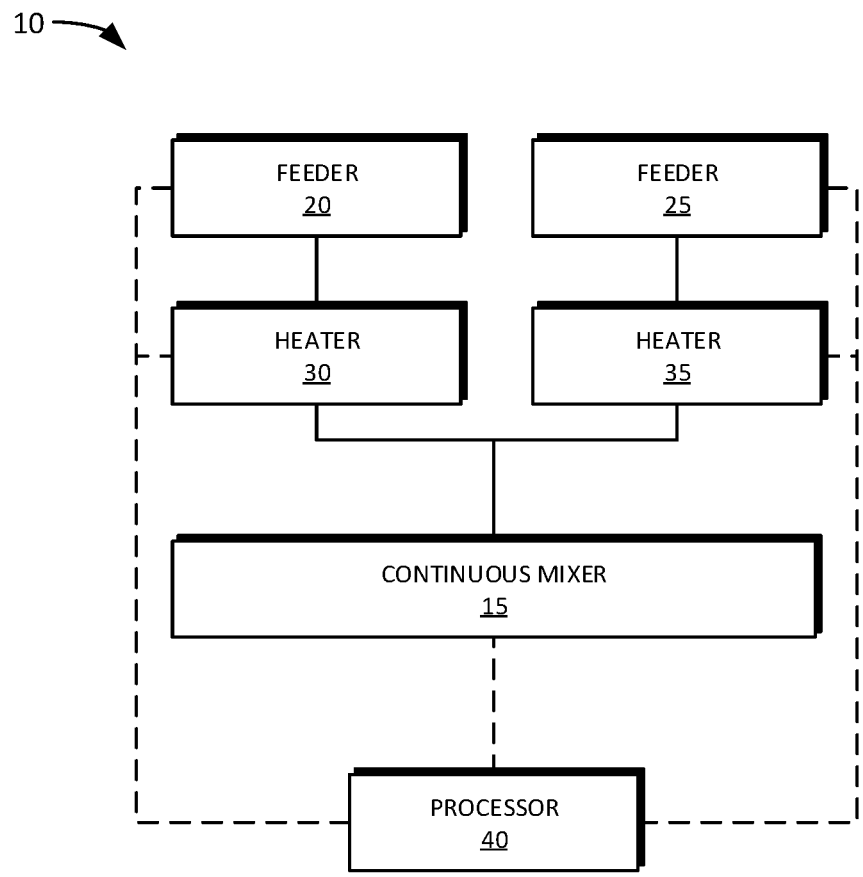
FIG. 1 shows a schematic diagram of a mixing system, according to some embodiments.

FIG. 1 shows a schematic diagram of a mixing system 10, according to some embodiments. The mixing system 10 generally includes a continuous mixer 15, a feeder 20, a feeder 25, a heater 30, and a heater 35. The mixing system 10 can be used to form a mixture of an abrasive solid material and a polymer additive to form a mixture that can be formed into, for example, a roofing tile.

The continuous mixer 15 can, in some embodiments, mix components without pressurizing the components. For example, the continuous mixer can mix a heated abrasive solid material and a heated polymer additive without adding pressure. This can, for example, enable the continuous mixer to be more reliable due to reduced wear on the internal components relative to, for example, a polymer extruder. In some embodiments, the continuous mixer continuously mixes and outputs the mixture.

The feeder 20 and the feeder 25 can be the same type of feeder. For example, in some embodiments, the feeder 20 and the feeder 25 can both be a loss-in-weight (LIW) feeder. It is to be appreciated that the feeder 20 and the feeder 25 may be different types of feeders. Additionally, in some embodiments, the feeder 20 and the feeder 25 can be a feeder other than a LIW feeder. The feeder 20 can be controlled to provide a material (e.g., a polymer additive) to the continuous mixer 15 at a selected feed rate. The feeder 25 can be controlled to provide a material (e.g., a polymer additive) to the continuous mixer 15 at a selected feed rate. The feed rates can be different. In some embodiments, the feed rates can be selected to achieve a selected ratio between the two feed rates. The selected ratio can, for example, be selected to control the feed rates according to, for example, the materials being mixed.

The heater 30 and the heater 35 can be the same types of heaters. In some embodiments, the heater 30 and the heater 35 can be different types of heaters. The heater 30 and the heater 35 are capable of heating a material (e.g., a polymer additive and an abrasive solid material, respectively) to a selected temperature prior to mixing the materials in the continuous mixer 15. In the illustrated embodiment, the heater 30 and the heater 35 are illustrated as being between the feeder 20, the feeder 25, and the continuous mixer 15. It is to be appreciated that in some embodiments, the heater 30 and the heater 35 can be arranged so that the feeder 20 and the feeder 25 are between the heater 30, the heater 35, and the continuous mixer 15. In other words, the material can be measured, then heated, then provided to the continuous mixer 15 in some embodiments, while in other embodiments, the material can be heated, then measured, then provided to the continuous mixer 15. Further, in some embodiments, the heater 30 can be included in the continuous mixer 15 for heating the polymer additive in a first stage of the continuous mixer 15 (e.g., prior to the heated abrasive solid material being added to the continuous mixer 15.

The polymer additives, whether heated prior to the continuous mixer 15 or within a first stage of the continuous mixer 15, are added to the continuous mixer 15 and melted prior to the heated abrasive solid material being added to the continuous mixer 15. This can, for example, enable the heated polymer additives to provide a lubrication effect to the parts of the continuous mixer 15.

Optionally, the feeder 20, feeder 25, heater 30, and heater 35 can be in electronic communication with a processor 40 (e.g., a programmable logic controller (PLC) or the like). In such embodiments, the feed rates of the feeder 20 and the feeder 25 can be controlled and modified to account for real-time or substantially real-time conditions in the continuous mixer 15. Similarly, the temperatures of the heater 30 and the heater 35 (and accordingly, the materials heated thereby) can be controlled and modified to account for real-time or substantially real-time conditions in the continuous mixer 15. In some embodiments, the processor 40 can be configured to maintain the ratio of the first feed rate and the second feed rate to be a selected ratio. The selected ratio can be based on, for example, the materials being mixed.

Figure 2:
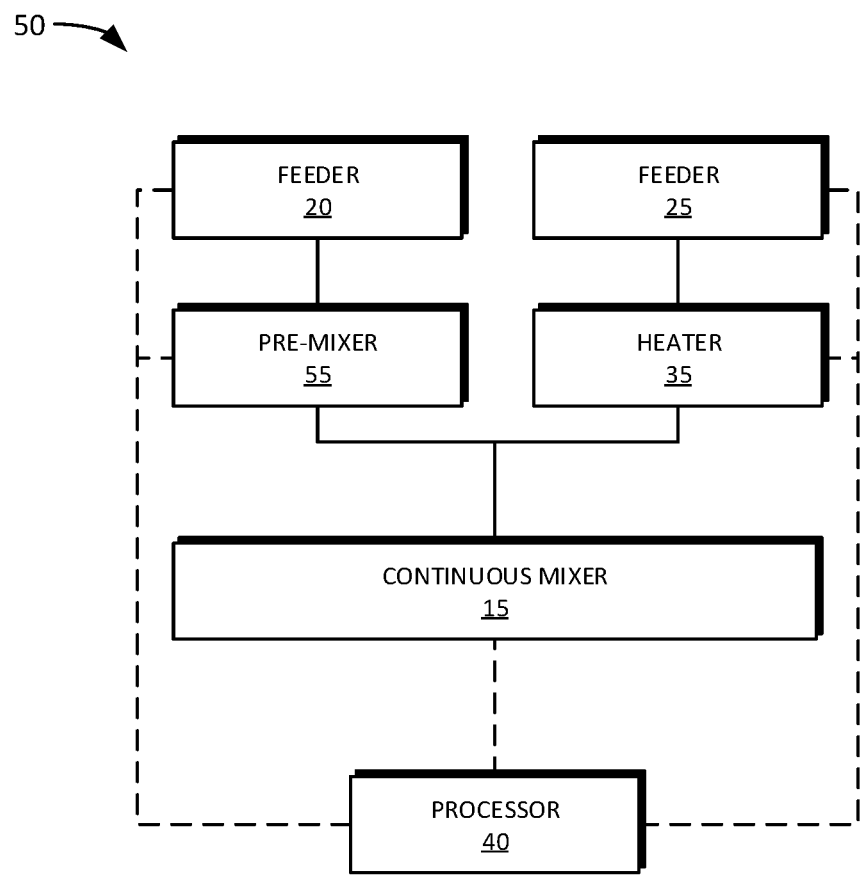
FIG. 2 shows a schematic diagram of a mixing system, according to some embodiments.

FIG. 2 shows a schematic diagram of a mixing system 50, according to some embodiments. The mixing system 50 can share features of the mixing system 10. The mixing system 50 can include one or more modifications from the mixing system 10, and as such, can be an alternative mixing system to the mixing system 10. The mixing system 50 can be used to form a mixture of an abrasive solid material and a polymer additive to form a mixture that can be formed into, for example, a roofing tile.

For simplicity of this Specification, aspects of the mixing system 50 that are the same as the mixing system 10 will not be described in additional detail.

The mixing system 50 includes a pre-mixer 55 in place of the heater 30 (FIG. 1). As such, the mixing system 50 can include a material that is fed into the pre-mixer 55, in which the material is heated. The heated material can then be provided to the continuous mixer 15. In some embodiments, the pre-mixer 55 can be a stage of the continuous mixer 15 and therefore a component of the continuous mixer 15. In some embodiments, the pre-mixer 55 can be a separate mixer configured to heat the polymer additive and provide to the continuous mixer 15 in a melted form prior to the heated abrasive solid material being added to the continuous mixer 15.

In the mixing system 50, the feeder 20 may include a plurality of feeders 20 that are capable of providing controlled amounts of a material such as, a polymer additive or the like, to the pre-mixer 55. These materials can then be both heated and mixed in the pre-mixer 55 and output to the continuous mixer 15 for being mixed with the abrasive solid material from the feeder 25. In some embodiments, the pre-mixer 55 can be a continuous mixer.

Figure 3:
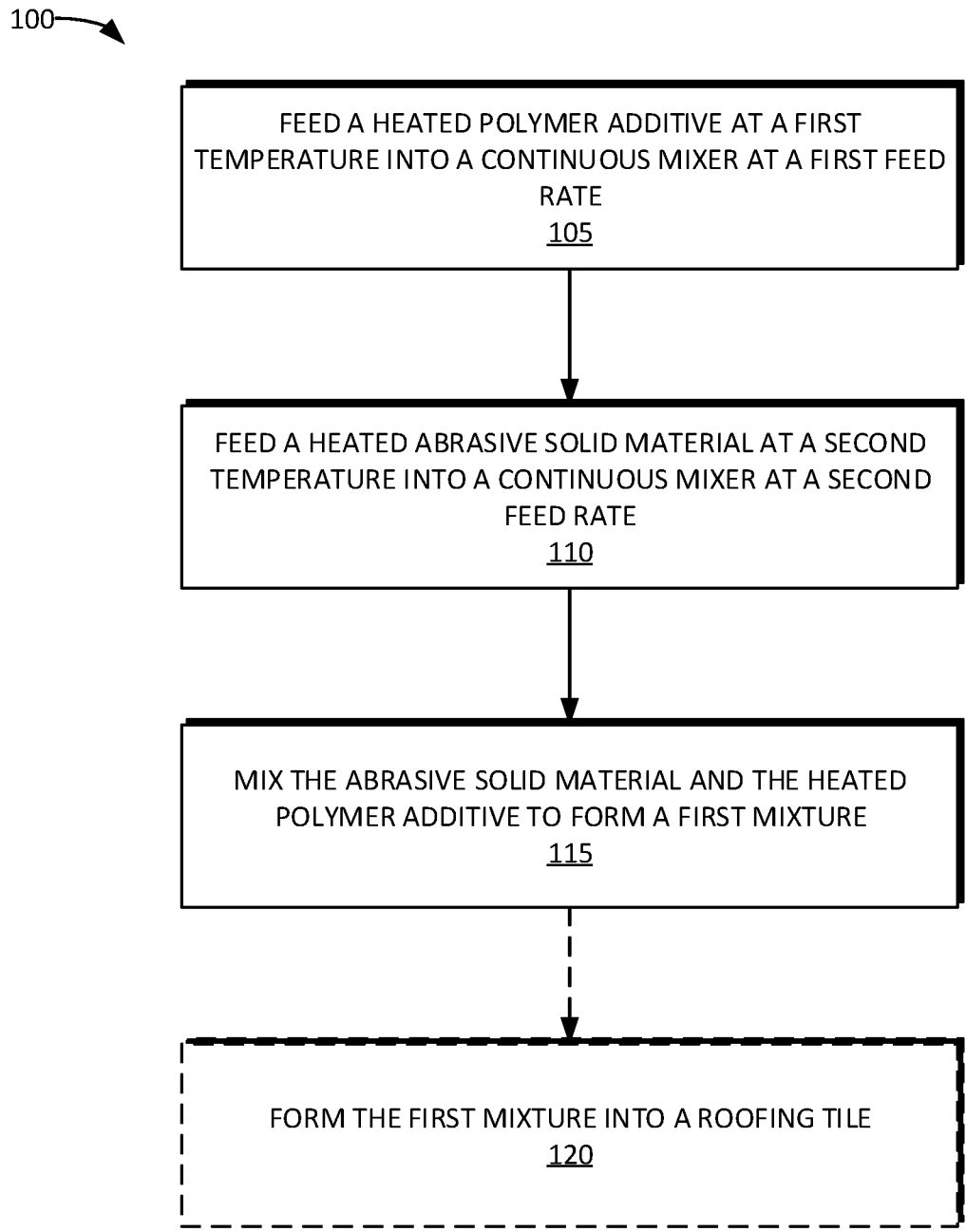
FIG. 3 shows a flowchart for a method, according to some embodiments.

FIG. 3 shows a flowchart for a method 100, according to some embodiments. The method 100 can generally form a mixture including a heated polymer additive and a heated abrasive solid material. The mixture can be, for example, formed into a roofing tile. In some embodiments, the method 100 can be performed using the mixing system 10 (FIG. 1) or the mixing system 50 (FIG. 2).

At block 105, the method 100 includes feeding a heated polymer additive at a first temperature into the continuous mixer at a first feed rate. In some embodiments, the polymer additive can be in a pellet form or a powder form. The first temperature can be selected such that the heated polymer additive is melted, and therefore the feeding can include pumping the polymer additive into the continuous mixer. In some embodiments, the polymer additive can include, for example, a polymer such as, but not limited to, acrylonitrile butadiene styrene (ABS), polystyrene, polyethylene such as low density polyethylene (LDPE) or high density polyethylene (HDPE), polypropylene, combinations thereof, or the like.

In some embodiments, in addition to the polymer additive, an additive can include a flame retardant, a colorant, or a combination thereof, and the additive will be fed at a specified feed rate, which may be different from the first feed rate. The additives, like the polymer additives, can be heated to form a heated additive. In some embodiments, block 105 can include feeding a plurality of heated polymer additives into the continuous mixer. In such embodiments, the heated polymer additives can each have a corresponding first temperature and a corresponding first feed rate. That is, in such embodiments, the heated polymer additives can be at different temperatures from each other and provided to the continuous mixer at different feed rates from each other. In some embodiments, the plurality of heated polymer additives can be at a same temperature and provided to the continuous mixer at a same feed rate. In some embodiments, the plurality of heated polymer additives can be at a same temperature and provided to the continuous mixer at different feed rates. The polymer additive and any additional additive are heated above their melting points either in the continuous mixer (e.g., a first stage) or prior to being fed or pumped to the continuous mixer. In some embodiments, the polymer additive and any additional additive are heated 1° F. above their melting points. In some embodiments, the polymer additive and any additional additive are heated 2° F. above their melting points. In some embodiments, the polymer additive and any additional additive are heated 5° F. above their melting points. In some embodiments, the polymer additive and any additional additive are heated 10° F. above their melting points. In some embodiments, the polymer additive and any additional additive are heated 15° F. above their melting points. In some embodiments, the polymer additive and any additional additive are heated 20° F. above their melting points.

At block 110, the method 100 includes feeding a heated abrasive solid material at a second temperature into the continuous mixer at a second feed rate. The heated abrasive solid material can include sand, stone dust, or combinations thereof. In some embodiments, the second feed rate is different from the first feed rate. In some embodiments, the second feed rate is relatively smaller than the first feed rate. In some embodiments, the second feed rate is 1% smaller than the first feed rate. In some embodiments, the second feed rate is 2% smaller than the first feed rate. In some embodiments, the second feed rate is 5% smaller than the first feed rate. In some embodiments, the second feed rate is 10% smaller than the first feed rate. In some embodiments, the second feed rate is 15% smaller than the first feed rate. In some embodiments, the second feed rate is 20% smaller or more than the first feed rate. As a result, in some embodiments, an amount of polymer additive supplied to the continuous mixer is greater than an amount of the abrasive solid material. In some embodiments, the second feed rate is relatively greater than the first feed rate. In some embodiments, the second feed rate is 1% greater than the first feed rate. In some embodiments, the second feed rate is 2% greater than the first feed rate. In some embodiments, the second feed rate is 5% greater than the first feed rate. In some embodiments, the second feed rate is 10% greater than the first feed rate. In some embodiments, the second feed rate is 15% greater than the first feed rate. In some embodiments, the second feed rate is at least 20% greater than the first feed rate. As a result, in some embodiments, an amount of polymer additive supplied to the continuous mixer is less than an amount of the abrasive solid material.

In some embodiments, block 110 can include feeding a plurality of heated abrasive solid materials into the continuous mixer. In such embodiments, the abrasive solid materials can each have a corresponding second temperature and a corresponding second feed rate. That is, in such embodiments, the heated abrasive solid materials can be at different temperatures from each other and provided to the continuous mixer at different feed rates from each other. In some embodiments, the plurality of abrasive solid materials can be at a same temperature and provided to the continuous mixer at a same feed rate. In some embodiments, the plurality of abrasive solid materials can be at a same temperature and provided to the continuous mixer at different feed rates.

In some embodiments, the polymer additive and any additional additive are heated and fed to the continuous mixer (block 105) prior to block 110.

At block 115, the heated abrasive solid material and the heated polymer additive are mixed in the continuous mixer to form a first mixture. The continuous mixer forms the first mixture without producing pressure. In some embodiments, the first mixture can include 70% by total weight or greater of the abrasive solid material. In some embodiments, the first mixture can include 75% by total weight or greater of the abrasive solid material. In some embodiments, the first mixture can include 80% by total weight or greater of the abrasive solid material. In some embodiments, the first mixture can include 85% by total weight or greater of the abrasive solid material. In some embodiments, the first mixture can include 90% by total weight or greater of the abrasive solid material. In some embodiments, the first mixture can include 10% by total weight or greater of the polymer additive. In some embodiments, the first mixture can include 15% by total weight or greater of the polymer additive. In some embodiments, the first mixture can include 20% by total weight or greater of the polymer additive. In some embodiments, the first mixture can include 25% by total weight or greater of the polymer additive. In some embodiments, the first mixture can include 30% by total weight or greater of the polymer additive.

Optionally, at block 120, the first mixture can be formed into a roofing tile. In some embodiments, the first mixture can be formed into a roofing tile by pressing the first mixture in a mold. In some embodiments, the first mixture can be formed into a roofing tile by a continuous forming method as described in accordance with FIG. 6 below (i.e., a method 300). It is to be appreciated that prior to block 120, the first mixture is output from the continuous mixer. To illustrate that block 120 is optional, it is illustrated in dashed lines in FIG. 3.

In some embodiments, the first and second feed rates and the first and second temperatures of blocks 105 and 110 can be controlled via a programmable logic controller (PLC). Inclusion of such a controller can account for the operating conditions of the continuous mixer. For example, in some embodiments, the first and second feed rates and the first and second temperatures can be controlled and modified based on the particular abrasive solid material and the polymer additive.

Figure 4:
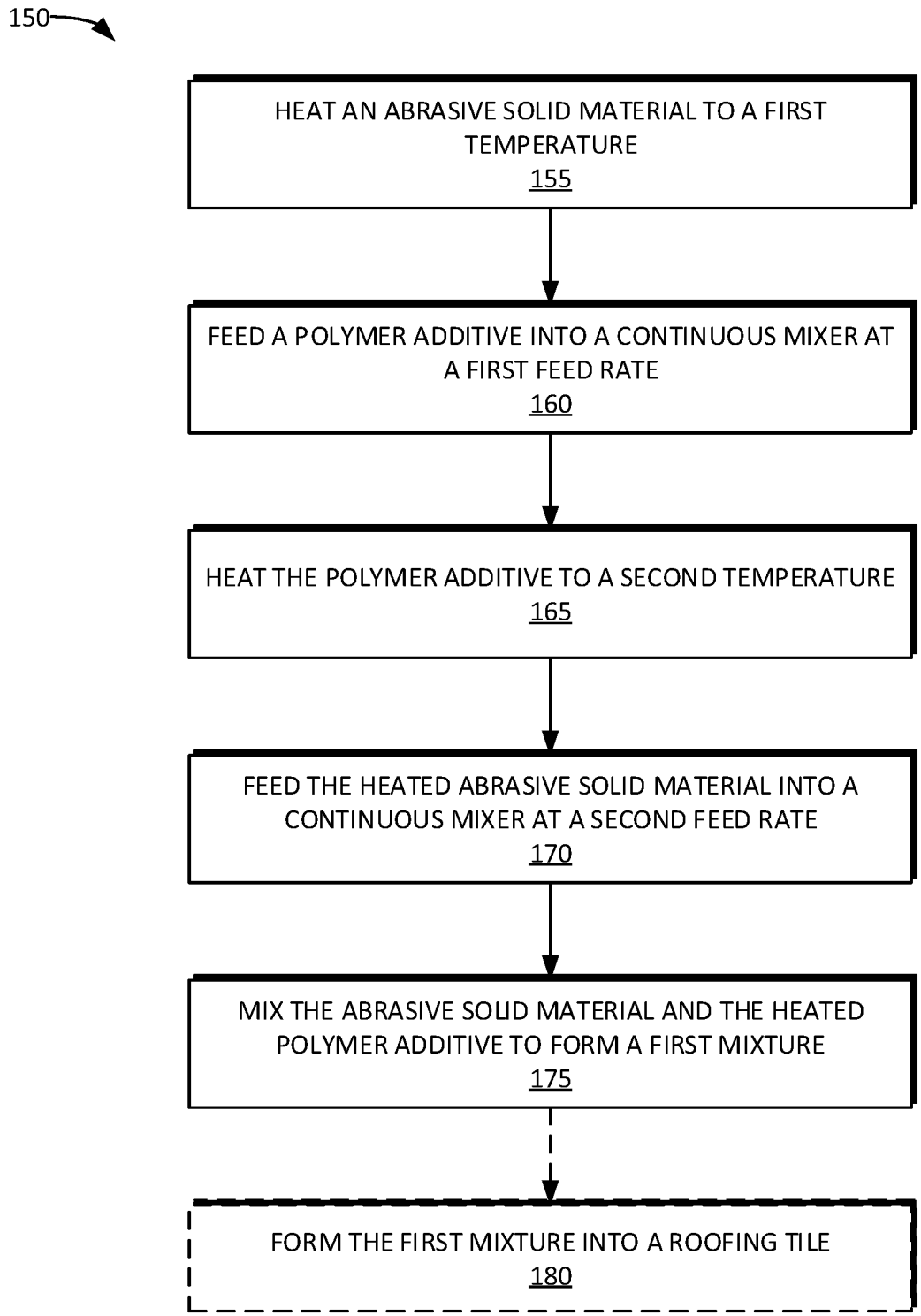
FIG. 4 shows a flowchart for a method, according to some embodiments.

FIG. 4 shows a flowchart for a method 150, according to some embodiments. The method 150 can generally form a mixture including a heated polymer additive and a heated abrasive solid material. The mixture can be, for example, formed into a roofing tile. In some embodiments, the method 150 can be performed using the mixing system 10 (FIG. 1) or the mixing system 50 (FIG. 2).

At block 155, the method 150 includes heating an abrasive solid material to a first temperature to form a heated abrasive solid material. The heated abrasive solid material can include sand, stone dust, or combinations thereof.

In some embodiments, a plurality of abrasive solid materials can be heated at block 155. In such embodiments, the plurality of abrasive solid materials can be heated to different temperatures. In some embodiments, the plurality of abrasive solid materials can be heated to a same temperature.

At block 160, the method 150 includes feeding a polymer additive into a continuous mixer at a first feed rate.

At block 165, the method 150 includes heating the polymer additive to a second temperature to form a heated polymer additive. The second temperature is greater than a melting temperature of the polymer additive. In some embodiments, the polymer additive can include a flame retardant, a colorant, or a combination thereof.

In some embodiments, a plurality of polymer additives can be heated at block 165. In such embodiments, the plurality of polymer additives can be heated to different temperatures. In some embodiments, the plurality of polymer additives can be heated to a same temperature.

At block 170, after the polymer additive has been heated, the method 150 includes feeding the heated abrasive solid material at the first temperature into a continuous mixer at a second feed rate.

At block 175, the method 150 includes mixing the heated abrasive solid material and the heated polymer additive in the continuous mixture to form a first mixture.

Optionally, at block 180, the first mixture can be formed into a roofing tile. In some embodiments, the first mixture can be formed into a roofing tile by pressing the first mixture in a mold. In some embodiments, the first mixture can be formed into a roofing tile by a continuous forming method as described in accordance with FIG. 6 below (i.e., a method 300). It is to be appreciated that prior to block 180, the first mixture is output from the continuous mixer.

Figure 5:
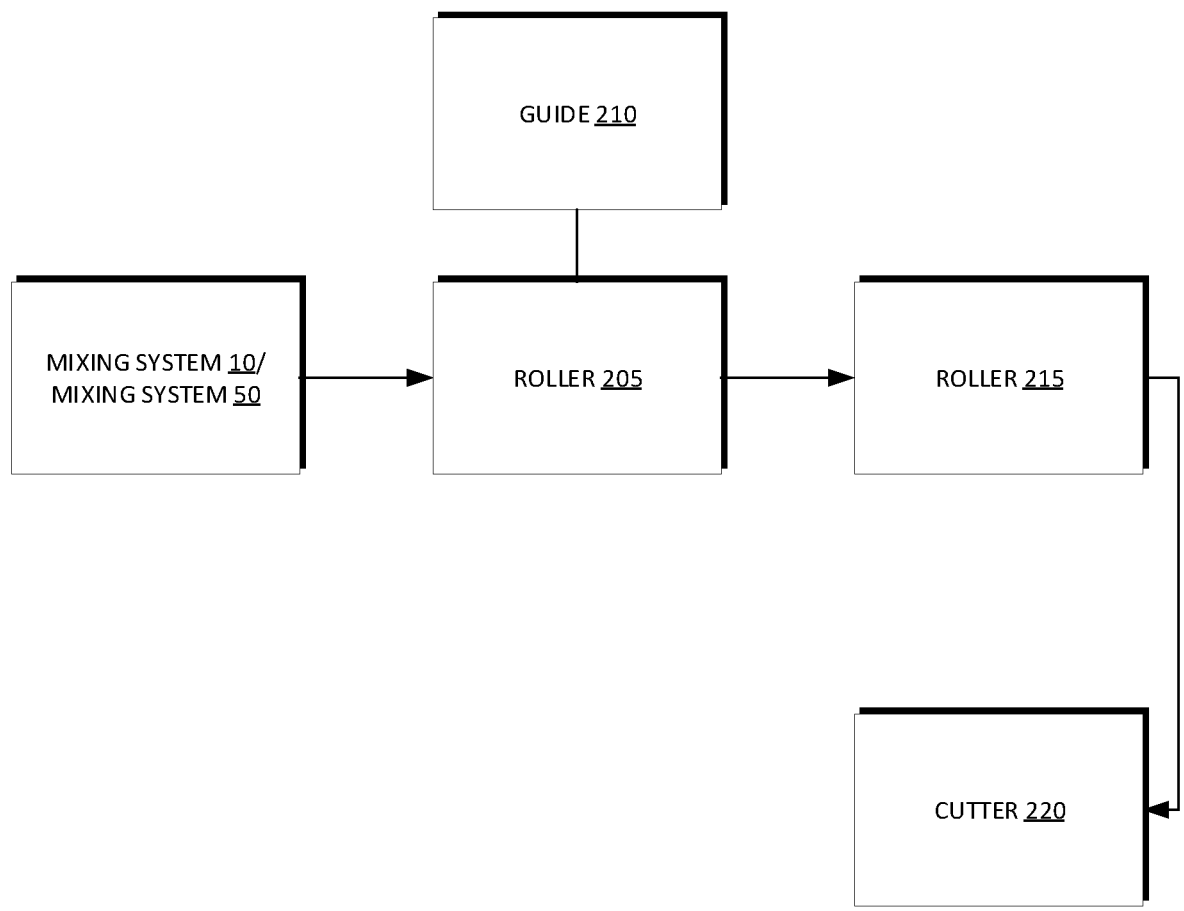
FIG. 5 shows a schematic diagram of a continuous roofing tile production system, according to some embodiments.

FIG. 5 shows a schematic diagram of a continuous roofing tile production system 200, according to some embodiments. The system 200 includes the mixing system 10 or the mixing system 50 to produce a mixture that can be formed into a roofing tile. The system 200 can form the roofing tile in a process continuous and in-line with the mixing system 10 or the mixing system 50 without the use of a press or forming die. In some embodiments, the system 200 can provide for production of roofing tiles in a more efficient manner with a higher throughput than using a press or forming die.

The system 200 includes a roller 205 downstream of the outlet of the mixture output from the mixing system 10 or the mixing system 50. In some embodiments, the roller 205 is heated. In some embodiments, the roller 205 includes a plurality of rollers. In some embodiments, the roller 205 includes a plurality of heated rollers. In some embodiments, the plurality of rollers is geared together to have the same surface speed. In some embodiments, the plurality of rollers is spaced apart to widen the mixture through each successive roller until a final thickness is achieved. In some embodiments, the plurality of rollers can include one or more heated rollers and one or more unheated rollers. In some embodiments, the roller 205 includes a plurality of top and bottom rollers through which the material is fed. In some embodiments, the top roller can include a band to transport the material more easily through the bottom roller. In some embodiments, the bottom roller can include a dead plate bridge or doctor blade to prevent material from rolling over the form of the roller. In some embodiments, the roller 205 may be grooved or embossed to increase a grip of the material. In some embodiments, the roller 205 may be coated with a non-stick or high release coating to prevent sticking of the mixture.

In some embodiments, the system 200 includes guides 210 disposed on outer sides of the roller 205 to confine the mixture during the flattening process. In some embodiments, the system 200 includes one or more rollers 215 to smooth the sides of the mixture as it is flattened.

The system 200 may include a cutter 220 to cut the formed material into discrete tiles having selected dimensions (i.e., length and width).

Figure 6:
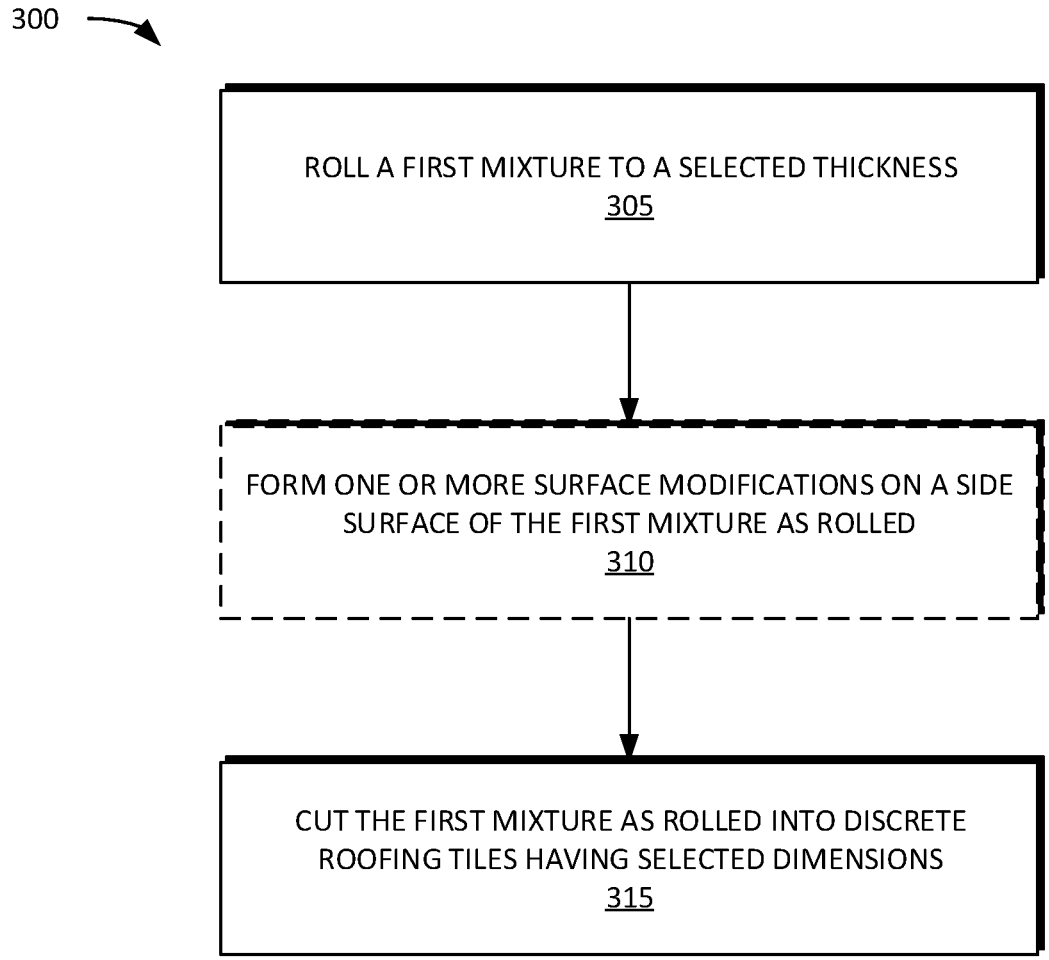
FIG. 6 shows a flowchart for a method, according to some embodiments.

FIG. 6 shows a flowchart for a method 300, according to some embodiments. The method 300 can be performed at block 120 (FIG. 3) or block 180 (FIG. 4). As such, the method 300 can begin with receiving a first mixture as output from the mixing system 10 or the mixing system 50.

At block 305, the method 300 includes rolling the first mixture to a selected thickness. In some embodiments, the selected thickness is a defined thickness for the roofing tile being formed. In some embodiments, the selected thickness can be from 5 mm to 20 mm. In some embodiments, the selected thickness can be from 5 mm to 19 mm. In some embodiments, the selected thickness can be from 5 mm to 18 mm. In some embodiments, the selected thickness can be from 5 mm to 17 mm. In some embodiments, the selected thickness can be from 5 mm to 16 mm. In some embodiments, the selected thickness can be from 5 mm to 15 mm. In some embodiments, the selected thickness can be from 5 mm to 14 mm. In some embodiments, the selected thickness can be from 5 mm to 13 mm. In some embodiments, the selected thickness can be from 5 mm to 12 mm. In some embodiments, the selected thickness can be from 5 mm to 11 mm. In some embodiments, the selected thickness can be from 5 mm to 10 mm. In some embodiments, the selected thickness can be from 5 mm to 9 mm. In some embodiments, the selected thickness can be from 5 mm to 8 mm. In some embodiments, the selected thickness can be from 5 mm to 7 mm. In some embodiments, the selected thickness can be from 5 mm to 6 mm. In some embodiments, the selected thickness can be from 6 mm to 20 mm. In some embodiments, the selected thickness can be from 7 mm to 20 mm. In some embodiments, the selected thickness can be from 8 mm to 20 mm. In some embodiments, the selected thickness can be from 9 mm to 20 mm. In some embodiments, the selected thickness can be from 10 mm to 20 mm. In some embodiments, the selected thickness can be from 11 mm to 20 mm. In some embodiments, the selected thickness can be from 12 mm to 20 mm. In some embodiments, the selected thickness can be from 13 mm to 20 mm. In some embodiments, the selected thickness can be from 14 mm to 20 mm. In some embodiments, the selected thickness can be from 15 mm to 20 mm. In some embodiments, the selected thickness can be from 16 mm to 20 mm. In some embodiments, the selected thickness can be from 17 mm to 20 mm. In some embodiments, the selected thickness can be from 18 mm to 20 mm. In some embodiments, the selected thickness can be from 19 mm to 20 mm. In some embodiments, the selected thickness can be from 6 mm to 10 mm.

The method 300 can include rolling the first mixture via the roller 205 (FIG. 5). In some embodiments, block 305 includes a plurality of heated rollers reducing the thickness of the first mixture incrementally until the selected thickness is reached.

At block 310, the method 300 optionally includes forming one or more surface modifications on a side surface of the first mixture as rolled. For example, in some embodiments, block 310 can include a guide that confines the side surfaces of the first mixture as the first mixture is rolled at block 305. In some embodiments, block 310 can include one or more additional rollers being used to form modifications to the side surface of the first mixture as rolled. In some embodiments, block 310 can be concurrent with block 305. In some embodiments, block 310 can be after block 305.

At block 315, the method 300 includes cutting the first mixture as rolled into discrete roofing tiles having selected dimensions (e.g., length and width). In some embodiments, the dimensions can vary depending upon a particular roofing tile application. In some embodiments, the length can be from 150 mm to 350 mm. In some embodiments, the length can be from 150 mm to 325 mm. In some embodiments, the length can be from 150 mm to 300 mm. In some embodiments, the length can be from 150 mm to 275 mm. In some embodiments, the length can be from 150 mm to 250 mm. In some embodiments, the length can be from 150 mm to 225 mm. In some embodiments, the length can be from 150 mm to 200 mm. In some embodiments, the length can be from 150 mm to 175 mm. In some embodiments, the length can be from 175 mm to 350 mm. In some embodiments, the length can be from 200 mm to 350 mm. In some embodiments, the length can be from 225 mm to 350 mm. In some embodiments, the length can be from 250 mm to 350 mm. In some embodiments, the length can be from 275 mm to 350 mm. In some embodiments, the length can be from 300 mm to 350 mm. In some embodiments, the length can be from 325 mm to 350 mm.

In some embodiments, as the first mixture moves through the system 200, the material may cool sufficiently that the roofing tiles can be stacked after having been cut at block 310.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method comprising:
   feeding at least one polymer additive into a continuous mixer at a first feed rate;
   heating the at least one polymer additive to a first temperature to form at least one heated polymer additive, wherein the first temperature is greater than a melting temperature of the at least one polymer additive;
   heating an abrasive solid material to a second temperature to form a heated abrasive solid material;
   feeding the heated abrasive solid material at the second temperature into the continuous mixer at a second feed rate;
   mixing the heated abrasive solid material and the at least one heated polymer additive in the continuous mixer to form a first mixture;
   rolling the first mixture with a plurality of heated rollers to a selected thickness; and
   cutting the rolled first mixture.

2. The method of claim 1, wherein one or more of:
   the at least one polymer additive comprises a plurality of polymer additives, and wherein the method further comprises separately heating at least some of the polymer additives of the plurality of polymer additives prior to feeding into the continuous mixer; and
   the heated abrasive solid material comprises a plurality of abrasive solid materials and wherein the method further comprises separately heating the plurality of abrasive solid materials.

3. The method of claim 1, wherein the at least one polymer additive comprises a plurality of polymer additives fed into the continuous mixer and heated to form the at least one heated polymer additive prior to feeding the heated abrasive solid material into the continuous mixer.

4. The method of claim 1, wherein one or more of:
   the heated abrasive solid material comprises sand, stone dust, or combinations thereof, and
   the heated polymer additive comprises flame retardants, colorants, or combinations thereof.

5. The method of claim 1, wherein the continuous mixer does not produce pressure while mixing the heated abrasive solid material and the heated polymer additive.

6. The method of claim 1, further comprising forming the first mixture into a roofing tile.

7. The method of claim 6, wherein forming the first mixture into the roofing tile comprises pressing the first mixture into a mold.

8. The method of claim 1, wherein the plurality of rollers include at least one unheated roll.

9. The method of claim 1, further comprising rolling a side surface of the first mixture to form one or more surface modifications.

10. The method of claim 1, wherein rolling the first mixture with a plurality of heated rollers to a selected thickness comprises rolling the first mixture with a first roller and rolling the first mixture with a second plurality of rollers to incrementally reduce the first mixture to the selected thickness.

11. The method of claim 1, wherein the second feed rate is less than the first feed rate.

12. The method of claim 11, wherein the second feed rate is 1% to 20% less than the first rate.

13. The method of claim 1, wherein the continuous mixer does not produce pressure while mixing the heated abrasive solid material and the heated polymer additive.

14. The method of claim 1, further comprising a programmable logic controller configured to maintain the first feed rate and the second feed rate at a selected ratio.

15. The method of claim 1, wherein rolling the first mixture with a plurality of heated rollers to a selected thickness comprises reducing the first mixture to a thickness of 5 mm to 20 mm.

16. The method of claim 1, wherein the at least one polymer additive comprises the polymer additive can include, for example, a polymer such as, but not limited to, acrylonitrile butadiene styrene (ABS), polystyrene, polyethylene such as low density polyethylene (LDPE) or high density polyethylene (HDPE), polypropylene, or combinations thereof.

17. The method of claim 1, wherein the second feed rate is greater than the first feed rate.

18. The method of claim 1, wherein the first mixture comprises 70% to 90% by total weight of the abrasive solid materials.

* * * * *